United States Patent [19]

Jaeger

[11] Patent Number: 5,309,934
[45] Date of Patent: May 10, 1994

[54] BALANCED PISTON FLUID VALVE

[76] Inventor: Robert A. Jaeger, 3822 Cloverhill Ct., Brandon, Fla. 33511

[21] Appl. No.: 65,810

[22] Filed: May 21, 1993

[51] Int. Cl.⁵ .................. F16K 31/143; F16K 11/065; F16K 31/54
[52] U.S. Cl. ................................. 137/1; 137/614.13; 137/865; 137/833; 251/14; 251/63.5; 251/205; 251/212; 251/250; 251/325
[58] Field of Search .............. 251/14, 63.5, 63.6, 251/212, 250, 324, 325, 205, 282; 137/219, 221, 222, 614.11, 614.13, 862, 865, 883

[56] References Cited

U.S. PATENT DOCUMENTS

| | | | |
|---|---|---|---|
| 1,209,796 | 12/1916 | Anderson | 251/14 |
| 1,564,252 | 12/1925 | Larner | 251/14 |
| 1,636,661 | 7/1927 | Larner | 137/222 |
| 1,734,733 | 11/1929 | Kruse | 137/221 |
| 2,784,730 | 3/1957 | Soomil | 251/14 |
| 2,954,205 | 9/1960 | Musser | 251/212 |
| 4,351,353 | 9/1982 | Filidoro et al. | 251/14 |

FOREIGN PATENT DOCUMENTS

| | | | |
|---|---|---|---|
| 115325 | 11/1900 | Fed. Rep. of Germany | 251/14 |
| 2458728 | 2/1981 | France | 251/14 |

Primary Examiner—George L. Walton
Attorney, Agent, or Firm—Charles A. McClure

[57] ABSTRACT

Balanced piston fluid valve, wherein annular outer and core inner coaxial valve members are adapted to move to and fro slidably relative to one another and to bar upstream-to-downstream fluid flow when mutually juxtaposed into seated position but adapted to enable such flow when spaced apart in unseated position.

17 Claims, 3 Drawing Sheets

BALANCED PISTON FLUID VALVE

TECHNICAL FIELD

This invention relates to fluid valving and relates especially to means and methods for balancing actuation and adjustment thereof.

BACKGROUND OF THE INVENTION

Fluid valves, whether for liquids or gases, necessarily have components exposed to fluid being restrained from flowing as would have occurred in the absence of any valving. Increased pressure of fluid so restrained makes added demands upon valve structures, stressing not only connectors, housing, and seals, but also whatever part(s) may be designed to close, adjust, or open the valve to flow.

Conventional valves have been modified to cope with the forces to be overcome, as by shielding components with sliding or rotary sleeves, building leverage into an individual valve, or cascading valves to enable a small valve to control a larger one. Proponents have characterized some of those configurations as balanced, such as in U.S. Pat. Nos. to Peterson (U.S. Pat. No. 3,425,448) for Fluid Pressure Balanced Valve, Woodling (U.S. Pat. No. 3,658,450) for Balanced Fluid Pressure Valve Means, Vimercati (U.S. Pat. No. 4,190,231) for Bilaterally Balanced Fluid Control Valve. Numerous valve-adjustment mechanisms are known, including cams, pivoted arms, and even rack-and-pinion devices, some of which are shown in U.S. Pat. Nos. to Mumford (U.S. Pat. No. 829,120), Lohmolder (U.S. Pat. No. 2,074,701), and Tito (U.S. Pat. No. 4,260,128). Electro-mechanical actuators are known and are often employed for their capability of applying considerable force and, in servo form, for their ability to hold any selected position, such as fully closed, any given intermediate setting, or fully open.

Notwithstanding the existing variety of fluid valves, there is a pressing need to render valve structure and adjustment simpler and more nearly independent of applied fluid pressure, rather than going on and on to greater complexity and sophistication in order to cope with requirements for increasing reliability, safety, and utility. This present invention of mine meets that need in a fundamental way.

SUMMARY OF THE INVENTION

A primary object of the present invention is to balance out the fluid pressure applied to upstream surfaces of a fluid valve.

Another object of this invention is to simplify valve adjustment, at and between fully closed position and open positions.

A further object of the invention is to provide coaxial valve mechanisms adapted to accomplish the foregoing objects.

From a generalized method point of view, the objects of this invention are accomplished by laterally confining fluid flow to an open-ended substantially cylindrical passageway having a linear axis extending between an inlet opening thereinto (upstream) and an outlet opening therefrom (downstream) through which fluid is enabled to flow in open valving positions but not to flow in closed valving position, and interposing flow barriers dividing the passageway cross-section into a flow-obtruding axial or central core portion and a complementary flow-obtruding peripheral or annular portion. Those respective barriers are adapted in open valving position, when in non-juxtaposed mutually unseated locations lengthwise of the passageway, to extend across and to obtrude only individually respective parts of the passageway cross-sectional extent (rather than its entire extent), and in closed valving position, when juxtaposed into mutually seated locations lengthwise of the passageway, together to extend across and obtrude essentially the entire cross-sectional extent of the passageway and thereby to preclude flow therethrough.

More particularly, the method of this invention includes the steps of forming the passageway as a bore with a cylindrical wall in a valve housing, providing the annular barrier as a first pistonlike member fitting slidably against the cylindrical wall and hollowed internally, providing the core barrier as a second piston-like member fitting slidably within the hollowed interior of the first piston-like member and about the axis, and providing circumferential seats on the respective piston-like members adapted to be juxtaposed into mutual seating (i.e., sealing) contact in the closed position, and preferably including adjustability to move the piston-like members apart and also to move them together.

In general apparatus terms, the objects of the present invention are attained in fluid valve mechanism having a housing with a fluid inlet and a fluid outlet interconnected by an axial bore containing piston-like coaxial valve members movable therealong between limited upstream and downstream locations (including closed and open valve positions), being adapted to be mutually seated in the closed position and so obtruding the entire cross-sectional extent of the bore and precluding flow therethrough, and adapted to be mutually unseated in open position(s), and so obtruding only part of the bore cross-sectional extent, allowing flow through the unobtruded extent.

In a preferred embodiment, the valve mechanism includes a pair of coaxial piston-like valve members: an annular outer member fitting in coaxial orientation within the housing bore and slidably movable therealong between upstream and downstream location limits, itself being adapted to obtrude a peripheral extent of the bore crosssection but not a complementary inner or core extent of the bore cross-section; and a coaxial piston-like inner or core valve member fitting slidably within the outer valve member and itself adapted to obtrude only a complementary core cross-sectional extent of the bore, both piston-like members together being adapted when juxtaposed into mutually seated engagement (closed position) to obtrude essentially all of the housing bore cross-sectional extent.

The invention also preferably includes adjusting means adapted to move the outer and inner valve members axially along the bore in opposite directions between upstream and downstream locations, to and from a mutually seated closed position and a mutually unseated open position. The adjusting means preferably is adapted to pivot in one direction to move the piston-like members apart, and in the opposite direction to move them together, as by gear action or its equivalent.

Other objects of the present invention, together with means and methods for attaining the various objects, will become apparent from the following description and the accompanying diagrams of preferred embodiments presented here by way of example rather than limitation.

DESCRIPTION OF THE INVENTION

Figure 1:
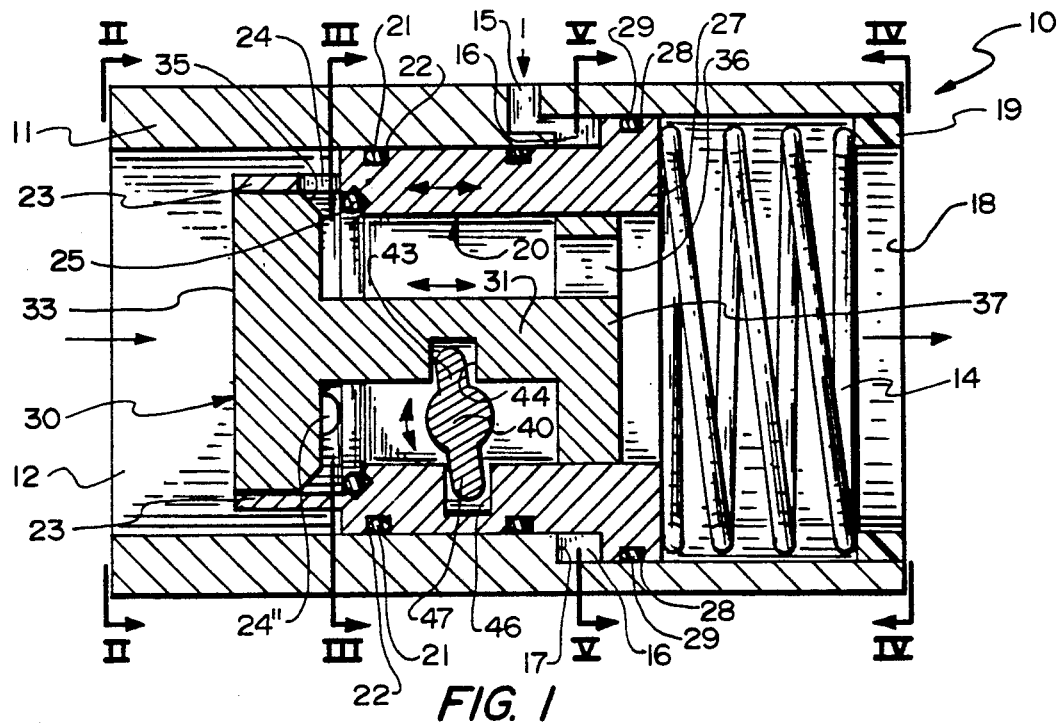
FIG. 1 is a side sectional elevation of a first embodiment.

FIG. 1 shows, in lengthwise (axial) side sectional elevation, valve embodiment 10, in open position, featuring cylindrical open-ended housing 11 having a cylindrical bore between inlet opening 12 at the left (arrow in) and outlet opening 18 at the right (arrow out) and step 17 from larger right, to smaller left, coaxial diameters of the housing bore. At top center the housing has small transverse pilot bore 15 extending first radially from the outside then doglegging to the right to erupt from the end of housing step 17 into annular pilot chamber 16 formed between adjacent ends of the respective valve members whenever spaced apart (as they are here).

Inside housing 11 are two coaxial piston-like valve members, each of which constitutes something of a barrier to flow of fluid. Annular outer member 20, stepped outward (lazy L-like in section) at its right end 27 to complement step 17 of the housing wall, fits slidably against and along the wall. Its hollow interior enables the annular outer valve member to surround piston-like core inner valve member 30 circumferentially. The latter surrounded valve member is H-like in axial section, having upstream (left) end portion 33, downstream (right) end portion 37, and intervening stem 31, and fits slidably over a limited axial distance within the outer member.

FIG. 1 also shows retaining ring 19 inside the open right end of the housing bore. This retaining bears against and retains in place the right end of helical spring 14, whose left end bears against right end 27 of annular outer piston-like member 20, biasing it against step 17 of the bore wall—to the closed valve position.

Circumferential grooves 22, 22' in left and intermediate portions of member 20 hold O-rings 21, 21' in sealing contact with the unstepped (smaller diameter) major portion of the housing bore wall, and similar groove 28 in right end portion of member 20 holds O-ring 29 in like sealing contact against the outwardly stepped (larger diameter) part of the housing bore wall. Extreme left end part 23 of annular piston-like member 20 is thinned radially from both of its cylindrical surfaces, relieving (spacing) it both (i) from the surrounding housing bore wall and accommodating flow to its hollow interior via small radially oriented bores 24, 24' (hidden here), and 24''; and (ii) from its otherwise uniform inner diameter to a larger diameter, thus accommodating the peripheral surface of the core piston-like member therewithin. Right end portion 37 of inner member 30 has axially parallel outlet bore 36 (and spaced companion 20 bores 36', 36''—hidden here) from the hollow between the outer and inner piston-like members into open outlet end 18 of the housing. The left inner rim of the non-relieved part of the outer piston-like member is chamfered into an oblique valve seat 25 (preferably with groove and O-ring) adapted to be juxtaposed, in the closed valve position, against parallel seat 35 of inner member 30. In seated position the left end of the inner member also slides across and closes off the radial bores of the outer member.

FIG. 1 also shows means for adjustment of the piston-like valve members between closed and open valve positions. The midpart of the inner (upper) wall of the outer piston-like member has slot 46 therein accommodating lower lobe 47 of adjusting shaft 40, and the underside of stem-like part 31 of the inner piston-like member has slot 44 in it accommodating upper lobe 43 of the adjusting shaft. The shaft may be located inside the valve housing and be equipped conventionally for electromagnetic actuation, or may extend (sealed) outside through the housing wall to be worked manually or otherwise. Resulting limited translatory movement of the piston-like members slides them oppositely axially to and from in cylindrical housing 11. It will be understood that respective seats 25 and 35 are juxtaposed into mutual seating (and sealing) engagement at the clockwise limit of shaft rotation, and are unseated by counterclockwise rotation.

FIGS. 2 to 5 augment FIG. 1 with left and right end views, and transverse sectional views, of the same structural embodiment, as indicated by corresponding Roman-numbered view lines on FIG. 1. The reference numerals are unchanged (but not all seen in every view).

Figure 2:
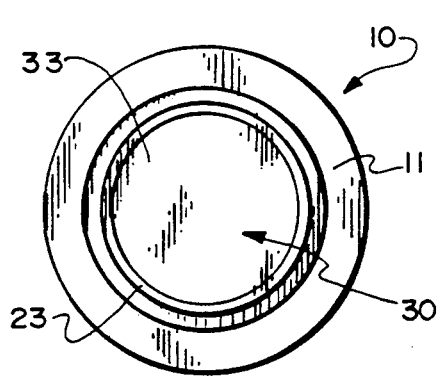
FIG. 2 is a left end elevation as indicated at II—II on FIG. 1.

FIG. 2 shows embodiment 10 of FIG. 1 viewed in end elevation from the left (at II—II on FIG. 1) showing inlet end 12 of housing 11 occupied mainly by circular end portion 33 of inner or core valve member 30, surrounded by thinned end portion 23 of outer annular valve member 20, spaced from the inside surface of the housing sidewall by a distance about equal to its reduced end thickness.

Figure 3:
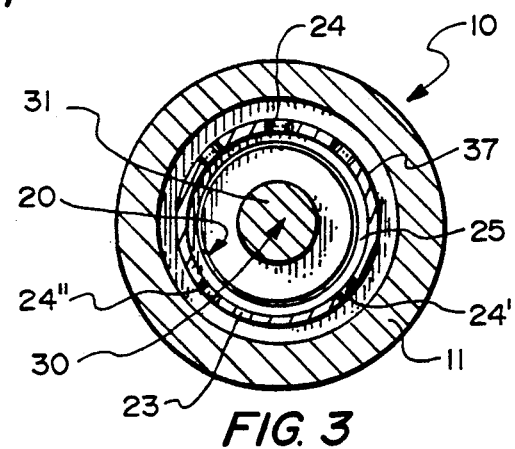
FIG. 3 is a transverse sectional view along III—III on FIG. 1.

FIG. 3 shows same embodiment 10 in transverse section (along III—III on FIG. 1) through spaced radial bores 24, 24', and 24'' in thinned end portion 23 of the outer member spaced from the housing wall. The next inner ring is chamfered edge 25 (O-ring not distinct) against which chamfered edge 35 (not seen here) of inner valve member 30 is adapted to seat. At the core is stem 31 of inner member 30 surrounded by the hollow between it and outer valve member 20.

Figure 4:
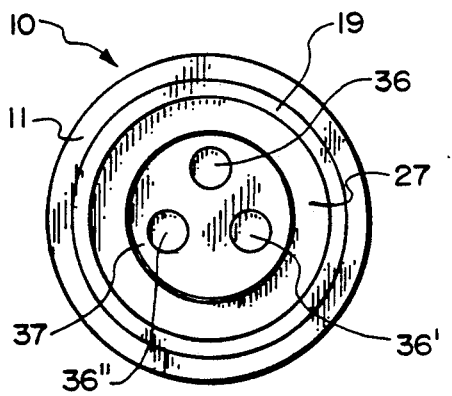
FIG. 4 is a right end elevation as shown at IV—IV on FIG. 1.

FIG. 4 shows same embodiment 10 viewed in end elevation from the right (at IV—IV on FIG. 1) which shows smaller end portion 37 of inner valve member 30 with spaced axial parallel bores 36, 36', 36'' and closely surrounded by thick end portion 27 of outer valve member 20. Just inside the outlet end of the housing bore is ring 19.

Figure 5:
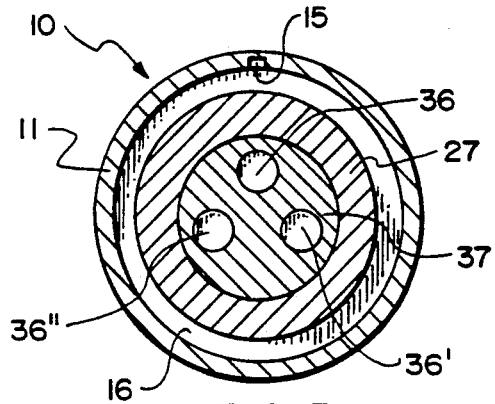
FIG. 5 is a transverse sectional elevation at V—V on FIG. 1.

FIG. 5 also shows this embodiment sectioned through housing 11 (at V—V on FIG. 1) and adjacent annular space 16 (adjacent the pilot bore, not shown here) created between the stepped outer wall and the body of outer member 20 adjacent the L-end thereof—when the valve is opened. Visible just inside the outer member is circumferential end portion 37 of inner core member 20 with spaced axially parallel bores 36, 36', 36" therethrough.

As shown in FIGS. 1 through 5, and as principally described, the first valve embodiment is considered to be at least partly open. Its closed position can be visualized from FIG. 1 by mentally expanding the biasing spring to the left until the L-base outward offset of the annular piston-like valve member abuts the step of the inside wall of the housing bore, whereupon the valve seats on respective annular and core piston-like members are mutually juxtaposed, and the left end part of the former closes off the radial bores in the latter, precluding flow through the valve mechanism. The overall operation of this embodiment is readily understood from the previous structural description and accompanying illustrations, as follows.

Movement to the closed position entails clockwise turning of the keylike adjusting shaft, moving the annular outer member leftward and the core inner member rightward, juxtaposing the seat on the left inner rim of the outer member and the seat on the right outer rim of the inner member. If the valve is to be opened, the shaft is turned counter-clockwise, moving the outer piston-like member to the right, and the inner piston-like member to the left, compressing the spring and opening communication between the exterior and the pilot chamber via the pilot opening. Instead of and/or in addition to turning the adjusting shaft, fluid may be forced into the pilot bore and chamber under sufficient pressure to open the valve or to aid in doing so. The valve can be readily closed subsequently by doing the opposite of the steps involved in opening it.

In subsequent embodiments, analogous parts are identified by the same two digits as in the first embodiment---but are prefixed by a third digit, different for each added embodiment. In the following embodiments, the prefixed third digits are 1 and 2, respectively.

Figure 6:
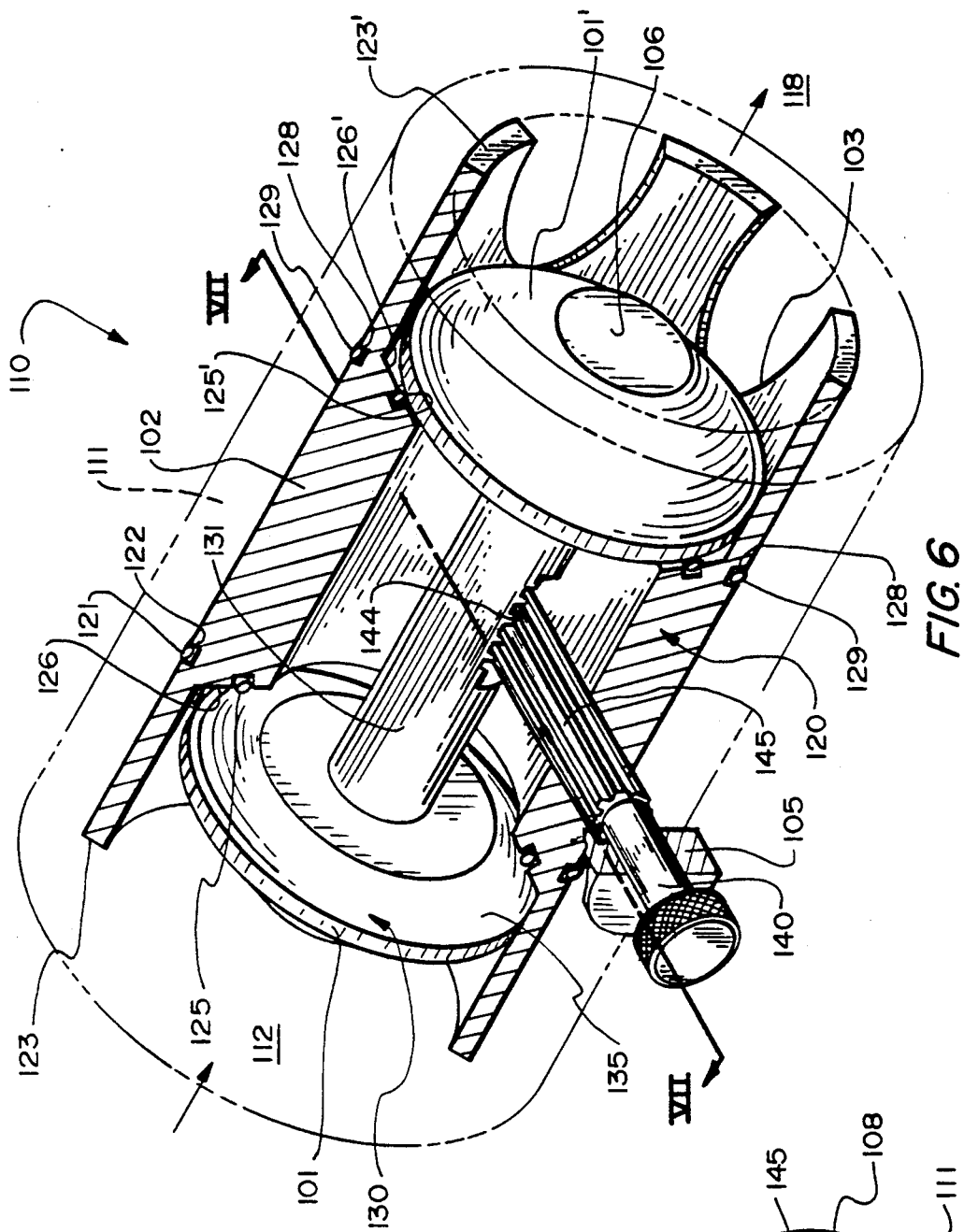
FIG. 6 is a perspective view, partly in phantom and partly cut away, of a second embodiment.
Figure 7:
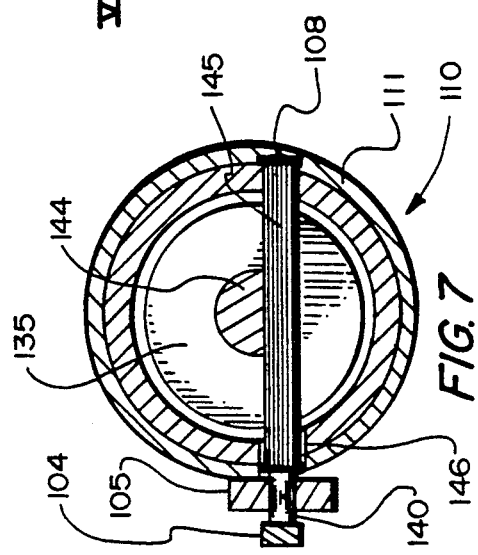
FIG. 7 is a medial transverse sectional elevation of the embodiment of FIG. 6.
Figure 8:
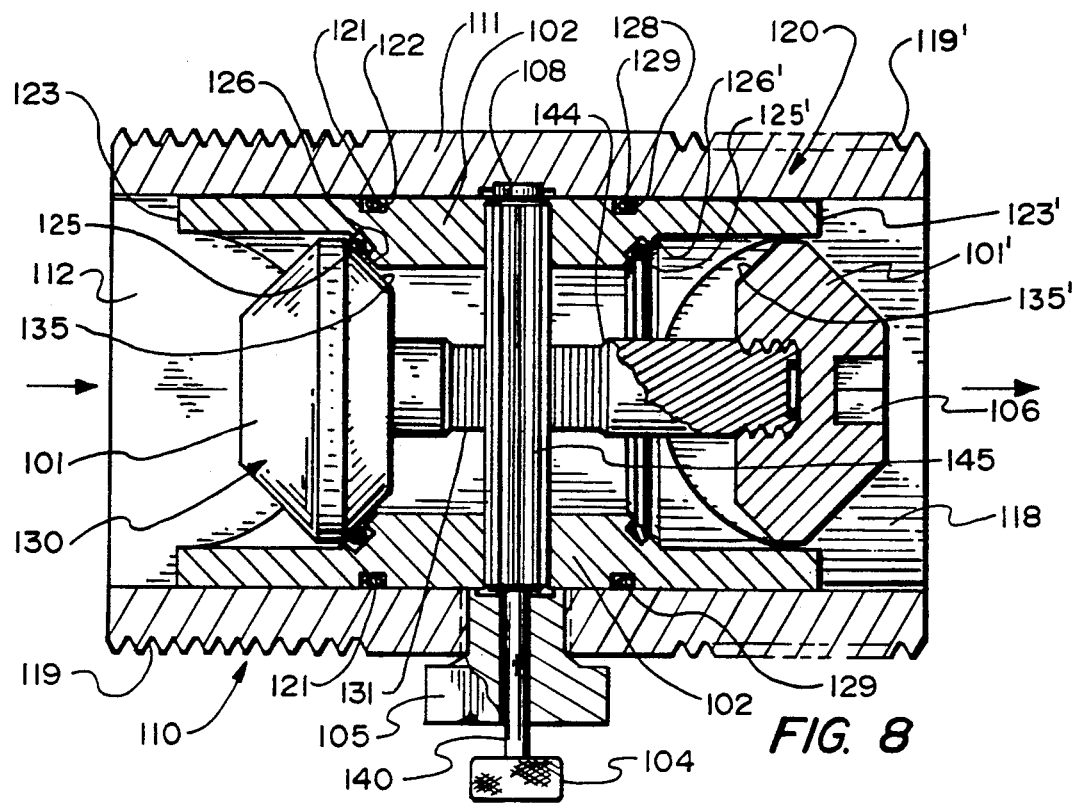
FIG. 8 is a bottom sectional plan of the second embodiment.

FIGS. 6, 7, and 8 show diverse views of valve embodiment 110: FIG. 6 in perspective, partly in phantom and partly sectioned away; FIG. 7, medial transverse section; FIG. 8, sectional bottom plan. This embodiment features housing 111 having an open-ended straight-through bore construction, from inlet opening 112 at the left to outlet opening 118 at the right. Housing ends 119, 119' are shown threaded outside in FIG. 8 for conventional screw-in attachment.

Annular outer piston-like valve member 120 of this embodiment has a cylindrical sleeve-like configuration, relatively thick in its midportion 102, and thinner at its opposite ends 123, 123'. This outer member fits slidably against the inside surface of the housing sidewall, has circumferential groove 122 near its upstream end accommodating O-ring 121 as sealing means, and has like groove 128 near its downstream end accommodating O-ring 129 for the same purpose. This cylindrical valve member has a plurality of curved indentations 103 in its opposite ends so as to enable fluid to flow from the inlet to the outlet past components of the inner or core coaxial piston-like valve member when the valve is open, that is whenever the respective valve members are not juxtaposed into mutual seating (and sealing) engagement as they are in the closed valve position.

Inner piston-like valve member 130 has a double-ended dumbbell configuration, with upstream bell 101 and downstream bell 101', both threaded onto interconnecting axial bar 131, as by use of a wrench in axial hex indentations 106 in their outer ends. The outer rims of the dumbbell pair fit slidably against—and are centered by contact with the inside surface of thinner wall portions 123, 123' of the annular valve member, which has its inner upstream rim 126 and downstream rim 126' chamfered parallel to the adjacent sloping dumbbell surfaces 135 and 135' and containing O-rings 125, 125' so as to seat therewith when they are juxtaposed to one another.

Both piston-like valve members are limited in their equal but opposite lengthwise movement by rack indentations 144 and 146 on the respective inner and outer piston-like valve members, as engaged by pinion gear 145 occupying most of the length of shaft 140 of the adjusting means, the smooth near end of which extends through a transverse bore in the near edge part of housing 111 and a slot in outer member 120—both ahead of the plane of this view and thus not shown. The far end of shaft 140 is journaled in recess 108 (FIG. 8) in the housing. Shaft 140 has knurled adjusting knob 104 on its near end and is held rotatably within hex nut 105 snugly fitted into the surrounding housing bore (unseen here). No attempt is made to show the sealing of the adjusting shaft, because such sealing is not a novel part of this invention and may be entirely conventional.

At either extreme of shaft rotation the valve is closed, as one of the oblique dumbbell surfaces is juxtaposed to the chamfered rim of the adjacent outer member and becomes sufficiently seated to it. At intermediate settings neither end is seated so the valve is open.

Figure 9:
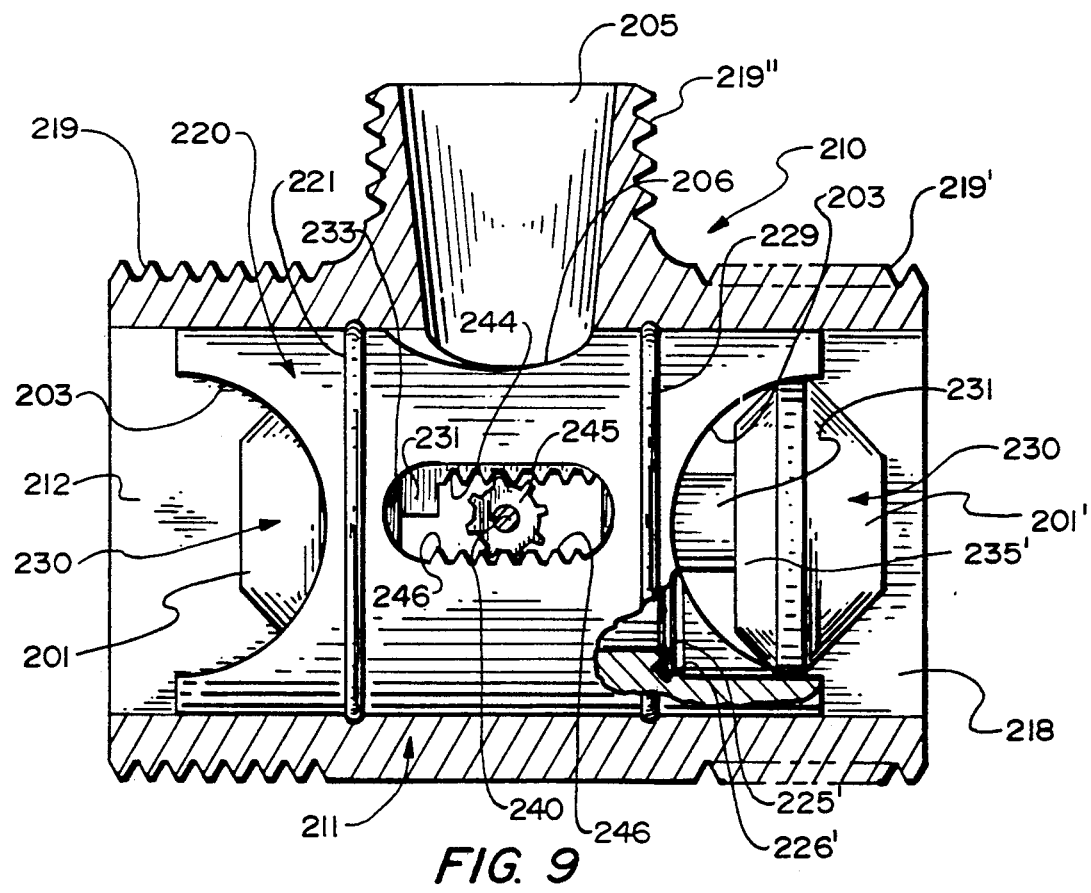
FIG. 9 is a side sectional elevation of a third embodiment much like the second embodiment but with an inverted-T three-way bore.

FIG. 9 shows third embodiment 210 in side elevation, partly sectioned away to show an interior substantially as in the FIGS. 6, 7, and 8 embodiment although this embodiment differs in having an inverted-T three-way configuration of housing bores. The external bore-defining T-ends of housing 211 are threaded externally, namely, horizontal ends 219, 219' and vertical end 219". The housing has a straight-through horizontal bore (between end openings 212 and 218) plus an intersecting vertical bore 205 communicating with the interior via opening 206 in the top of annular outer piston-like valve member 220. The cylindrical body of that outer valve member has circumferential O-rings 221, 229 in grooves flanking the added top opening, and its right and left ends have multiple curved indentations 203 therein. Those end indentations reveal part of left and right bells 201, 201' of dumbbell-shaped inner piston-like valve member 230 joined by bar 231, partly visible through slot 233 in the center of the view. Also visible through the slot are parts of rack portion 244 of bar 231 and rack portion 246 of the outer member. The bells have sloping faces 235, 235' adapted to seat against O-rings 225, 225' when juxtaposed to respective chamfered inner rims 226, 226' of the outer member at either extreme of adjustment—both being closed valve positions. Full clockwise rotation of pinion 245 by adjusting shaft 240 results in closure at the left, as here. Intermediate positions (readily visualized) open the valve at both horizontal ends—equally if centered, otherwise greater and lesser.

Thus, if bore 205 is connected to an upstream source of fluid under pressure, the outflow divides equally among end openings 212, 218 of the straight-through bore when centered in dual-open position--and unequally in all other open positions. With shaft 240 turned fully clockwise (as here) outflow will leave via right end opening 218 only, whereas at full counter-clockwise rotation of the shaft all outflow will leave via left end opening 212, as the bells of the inner member reverse their seated and unseated positions.

Either the 2-way embodiment of FIGS. 6, 7, and 8 or the 3-way embodiment of FIG. 9 can be interconnected in cascade with one another or with conventional valves to accommodate more complex flow circuits, such as for amplification or feedback, as well as for redirection or splitting of fluid streams.

The fluid valves of this invention do not require any special materials of construction but can be constructed of metal, plastic, glass, or other conventional material, depending upon the fluids and the fluid pressures, temperatures, and other conditions to which the valves are to be subjected. They can be threaded to existing piping or be secured adhesively where screw connection is not desirable.

The seals in the valves of this invention also can be made of conventional materials, such as those commonly employed for meeting similar gasketing requirements, and may be in the form of O-rings (as illustrated) or alternatively U-cups, diaphragms, etc. These valves are readily disassembled (and reassembled) as for cleaning, for replacement of seals or other parts, or for other maintenance.

The fluid-force balancing of valves of this invention provides system designers with the opportunity to meet diverse demands of the fluid system without necessary redesign of valve characteristics. Matching, or intentional mismatching, of whatever cross-sectional areas are presented to the fluid by the complementary piston-like valve members provides versatile valving able to cooperate with the applied fluid forces as desired, rather than fighting against them.

Various advantages of the application and use of this invention have been mentioned, and other beneficial features may well become apparent to persons who undertake to learn about or to practice it.

Preferred embodiments of this invention and variants of it have been described and illustrated. Other modifications may be made, as by adding, combining, deleting or subdividing compositions, parts, or steps, while retaining some of the advantages and benefits of the present invention—which itself is defined in the following claims.

The claimed invention:

1. Fluid valving method, comprising the steps of providing a valve body for laterally confining fluid flow to an open-ended substantially cylindrical passageway having a linear axis extending lengthwise between an upstream inlet opening and a downstream outlet opening, through which fluid is enabled to flow in open valving positions but is precluded from flowing in closed valving position;

providing flow barriers disposed within said passageway and dividing the passageway cross-section into an inner flow-obtruding axial valve core portion whose maximum diameter is less than the passageway diameter and a complementary outer flow-obtruding annular valve portion whose outside diameter equals the passageway diameter, said respective portions being movable one within the other to control the fluid flow;

providing position-adjustment means disposed intermediate and engaging said valve portions within said passageway for moving both valve portions one within the other between open and closed valving positions, in an open valving position, when in non-juxtaposed mutually unseated positions of said valve portions lengthwise of the passageway, to extend across and to obtrude individually respective spaced parts of the passageway crosssectional extent rather than its enter extent, to thereby allow fluid flow therethrough, and in a closed valving position, when juxtaposed into mutually seated positions of said valve portions lengthwise of the passageway, extending together across and obtruding essentially the entire cross-sectional extent of the passageway and thereby precluding fluid flow therethrough.

2. Fluid valving according to claim 1, including the step of so linking the core barrier and the complementary annular barrier to constrain their respective movements lengthwise of the passageway as being alternatively toward one another or away from one another.

3. Fluid valving method according to claim 1, including the step of moving the respective core and annular barriers together and into seated juxtaposition to effectuate the closed valving position.

4. Fluid valving method according to claim 1, including the step of moving the respective core and annular barriers apart and away from seated juxtaposition to effectuate open valving position.

5. Fluid valving method according to claim I, including the step of balancing the respective barriers in cross-sectional extent.

6. Fluid valving method according to claim 1, including the steps of forming the passageway for fluid as a bore with a cylindrical wall in a valve housing, providing the annular barrier as a first piston-like member fitting slidably against the cylindrical wall and hollowed internally; providing the core barrier as a second piston-like member fitting slidably within the hollowed interior of the first piston-like member and about the axis, and providing seats on the respective piston-like members adapted to be juxtaposed into mutual sealing contact in the closed position.

7. Balanced fluid valving method, comprising the steps of forming a passageway as a bore with a cylindrical wall in a valve housing and providing position-adjustment means for moving valve members therein into and away from mutually seated contact, providing therein an annular barrier as an outer piston-like valve member fitting slidably along the cylindrical wall and being hollowed internally about the axis.

providing therein a coaxial core barrier as an inner piston-like valve member fitting slidably along and partially within the hollowed interior of the outer piston-like valve member and about the axis, and providing seats on the piston-like valve members adapted to be moved by the position-adjustment means into mutual seated sealing contact so as to preclude fluid flow therethrough in the closed position and alternatively moved away from said contact so as to allow fluid flow therethrough in open position.

8. Balanced fluid valve constructed and operable according to the method of claim 7.

9. Balanced fluid valving method according to claim 7, including the step of interconnecting the respective piston-like members for movement toward one another and, alternatively, away from one another by positional adjustment from outside the valve housing.

10. Balanced fluid valving method according to claim 9, including interposing between the respective piston-like members rotary adjustment means adapted to pivot in one direction to move them apart and in the opposite direction to move them together.

11. Balanced fluid flow-controlling valve mechanism comprising coaxial valve members mutually seated against one another in closed position and mutually unseated in open position, and a housing with a fluid inlet and a fluid outlet interconnected by an axial bore containing the coaxial valve members, including a piston-like outer valve member fitting within the bore and movable therealong between limited up-stream and downstream positions and obtruding a peripheral annular extent of the bore cross-section but not obtruding a complementary core extent of the bore cross-section, and a piston-like inner valve member fitting within the outer valve member and movable therealong between mutually seated limited up-stream and downstream positions, and adapted when seated to obtrude the cross-sectional core extent of the bore complementary to the cross-sectional annular extent of the bore obtruded by the outer valve member, the outer and inner valve members being adapted, by being mutually seated in the closed position, to obtrude the entire crosssectional extent of the bore and thus prevent flow therethrough, and further adapted by being mutually unseated, in the open position, to obtrude only part of the bore cross-sectional extent and thereby to allow flow through the unobtruded cross-sectional extent thereof;

and adjusting means adapted to move the outer and inner valve members axially along the bore in opposite directions to and from the mutually seated closed position and the unseated open position.

12. Fluid valve mechanism according to claim 11, wherein the outer valve member and the inner valve member individually obtrude substantially equal cross sections of the bore, thereby balancing them in position, whether mutually seated or not, relative to fluid force applied to them in an upstream-to-downstream axial direction.

13. Balanced fluid flow-controlling valve mechanism comprising coaxial valve members mutually seated against one another in closed position and mutually unseated in open position, and a housing with a fluid inlet and a fluid outlet interconnected by an axial bore containing the coaxial valve members, including a piston-like outer valve member fitting within the bore and movable therealong between limited upstream and downstream positions and obtruding a peripheral annular extent of the bore crosssection but not obtruding a complemetary core extent of the bore cross-section, and a piston-like inner valve member fitting within the outer valve member and movable therealong between mutually seated limited upstream and downstream positions, and adapted when seated to obtrude the cross-sectional core extent of the bore complementary to the cross-sectional annular extent of the bore obtruded by the outer valve member, the outer and inner valve members being adapted, by being mutually seated in the closed position, to obtrude the entire cross-sectional extent of the bore and thus prevent flow therethrough, and further adapted by being mutually unseated, in the open position, to obtrude only part of the bore cross-sectional extent and thereby to allow flow through the unobtruded cross-sectional extent thereof;

and adjusting means adapted to move the outer and inner valve members axially along the bore in opposite directions to and from the mutually seated closed position and the unseated open position, including spring means bearing against and thereby adapted to bias one of the valve members toward closed position only.

14. Balanced fluid flow-controlling valve mechanism comprising coaxial valve members mutually seated against one another in closed position and mutually unseated in open position, and a housing with a fluid inlet and a fluid outlet interconnected by an axial bore containing the coaxial valve members, including a piston-like outer valve member fitting with the bore and movable therealong between limited upstream and downstream positions and obtruding a peripheral annular extent of the bore crosssection but not obtruding a complementary core extent of the bore cross-section, and a piston-like inner valve member fitting within the outer valve member and movable therealong between mutually seated limited upstream and downstream positions, and adapted when seated to obtrude the cross-sectional core extent of the bore complementary to the cross-sectional annular extent of the bore obtruded by the outer valve member, the outer and inner valve members being adapted, by being mutually seated in the closed position, to obtrude the entire crosssectional extent of the bore and thus prevent flow therethrough, and further adapted by being mutually unseated, in the open position, to obtrude only part of the bore cross-sectional extent and thereby to allow flow through the unobtruded cross-sectional extent thereof;

and adjusting means to move the outer and inner valve members axially along the bore in opposite directions to and from the mutually seated closed position and the unseated open position, including a rack on the outer valve member, a rack on the inner valve member, and a pinion interconnecting the two racks and adapted to be turned from outside the valve housing and thereby position the valve members axially relative to one another.

15. Balanced fluid flow-controlling valve mechanism comprising coaxial valve members mutually seated against one another in closed position and mutually unseated in open position, and a housing with a fluid inlet and a fluid outlet interconnected by an axial bore containing the coaxial valve members, including a piston-like outer valve member fitting within the bore and movable therealong between limited upstream and downstream positions and obtruding a peripheral annular extent of the bore cross-section but not obtruding a complementary core extent of the bore cross-section, and a piston-like inner valve member fitting within the outer valve member and movable therealong between mutually seated limited upstream and downstream positions, and adapted when seated to obtrude the cross-sectional core extent of the bore complementary to the cross-sectional annular extent of the bore obtruded by the outer valve member, the outer and inner valve members being adapted, by being mutually seated in the closed position, to obtrude the entire cross-sectional extent of the bore and thus prevent flow therethrough, and further adapted by being mutually unseated, in the open position, to obtrude only part of the bore cross-sectional extent and thereby to allow flow through the unobtruded cross-sectional extent thereof;

and adjusting means adapted to move the outer and inner valve members axially along the bore in opposite directions to and from the mutually seated closed position and the unseated open position;

wherein the housing includes also a bore substantially perpendicular to and intersecting the axial bore, and wherein the outer piston-like member has an opening through an intermediate portion of itself adapted to communicate with the intersecting bore in mutually seated and unseated positions of the piston-like outer and inner valve members, whereby fluid may be exhausted to the exterior to urge the valve members together and close the valve or fluid may be supplied from the exterior to urge the valve members further apart.

16. Fluid valve mechanism according to claim 15, positioned with the additional bore intersecting an intermediate portion of the axial bore and thereby interconnected to the upstream portion of the latter bore with the outer and inner piston-like members mutually seated downstream from the substantially perpendicular interconnection and thereby precluding flow into the downstream portion and out from the outlet opening.

17. Fluid valve mechanism according to claim 15, positioned with the additional bore intersecting an intermediate portion of the axial bore and thereby interconnected to the upstream portion of the latter bore with the outer and inner piston-like members mutually unseated and thereby enabling flow into the downstream portion and out from the outlet opening as well as into and out of the intersecting bore.

* * * * *